Patented Mar. 24, 1931

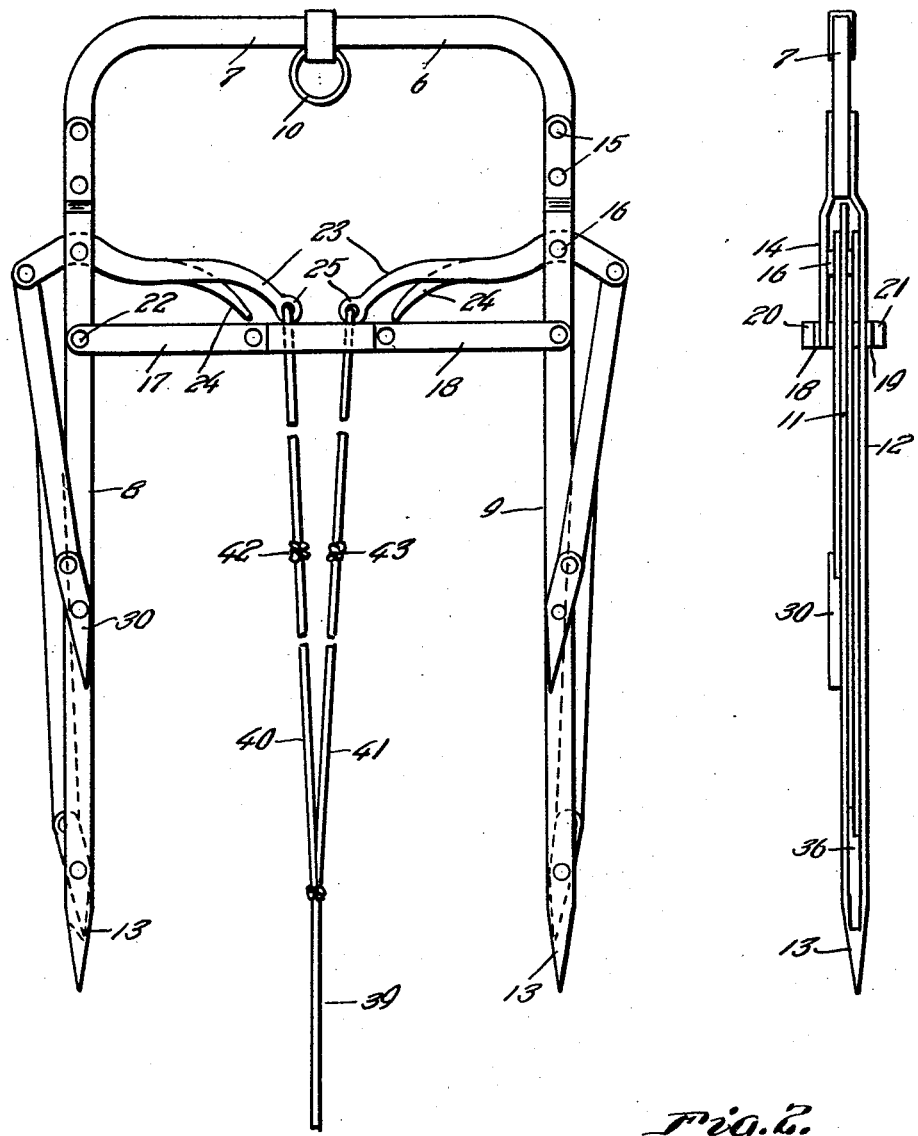

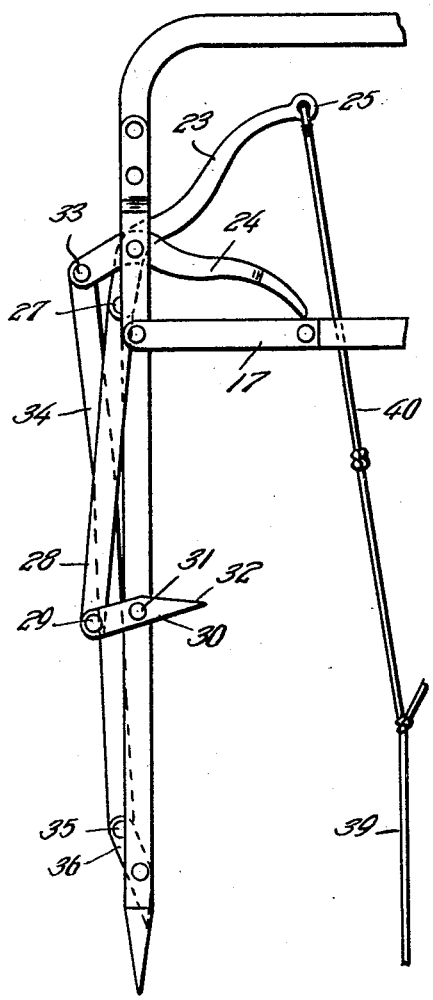
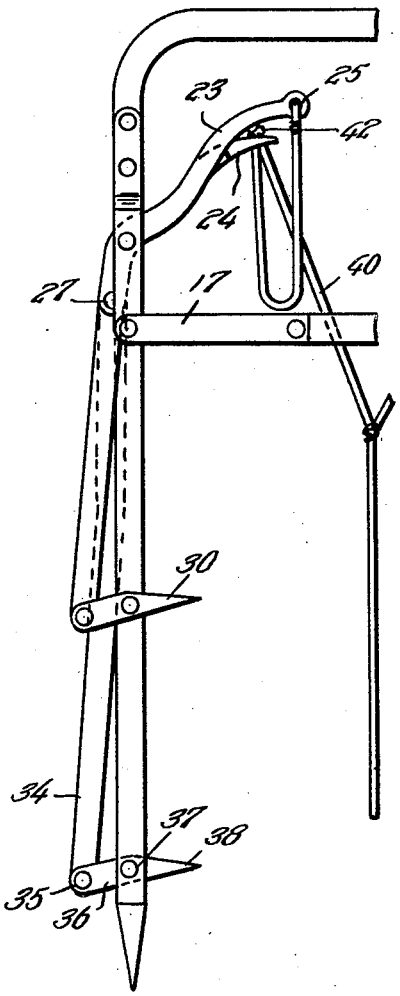
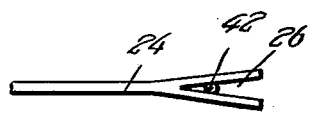

1,797,633

UNITED STATES PATENT OFFICE

CHARLES B. BROUGHTON, DALE A. LEIFHEIT, AND CARL A. CARLSON, OF DE KALB, ILLINOIS

HAYFORK

Application filed April 11, 1930. Serial No. 443,477.

This invention relates to hay forks, and an object of the invention is to provide a hay fork that is adapted to relieve part of its load at one time so as to evenly distribute the hay without requiring the spreading of the hay with hand forks.

Further objects of the invention are to provide a hay fork of the character referred to, that is strong, compact and durable, thoroughly reliable for its intended purpose, very simple in its method of assembly, thoroughly dependable in its operation, and comparatively inexpensive to manufacture and operate.

With the foregoing and other objects in view the invention consists of a novel combination and arrangement of parts and as will be hereinafter more specifically described and shown, but it is to be understood that changes, variations, and modifications may be resorted to without departing from the spirit of the claim hereto appended.

In the drawings wherein like reference characters designate like parts throughout the several views:—

Figure 1 is a front elevation of the hay fork in accordance with the present invention, showing both pairs of tripping dogs in the released position, Fig. 2 is a side elevation thereof, Fig. 3 is a fragmentary front elevation thereof showing the relative positions of the parts when the lower pair of tripping dogs are released, Fig. 4 is a fragmentary front elevation thereof showing both the tripping dogs in the engaged position, and Fig. 5 is a fragmentary top plan view of the outer end of one of the control arms for the lower tripping dogs.

In the drawings, wherein for the purpose of illustration is shown the preferred embodiment of our invention, 6 indicates generally the U-shaped supporting frame formed with a solid crown or bight portion 7, depending from which are the pair of legs indicated generally at 8, 9. Coupled to the center of the bight portion is a ring 10 to which the lower end of the hoisting cable, not shown in the drawings, is attached for lifting the frame 6 from the wagon into the hay mow where the hay is to be stored.

Each of the depending legs 8, 9 are formed with flat, spaced strips of steel 11, 12 that merge with each other at the lower end of the leg into the points 13 on the upper portion of each leg 8, 9, and there is a forwardly outset extension bar 14 folded at its upper end as at 15.

A pivot pin 16 extends through an intermediate portion of the extension arm 14 and the straps 11, 12 in length. To prevent these legs of the frame from bending in the center there is provided a cross support member 17.

This support member 17 is formed of a pair of horizontally disposed straps 18, 19 each of which is laterally outset as at 20, 21 at their centers to provide a pocket through which the control cable to be presently described extends.

The ends of the outer strap 18 are bolted as at 22 to the lower ends of the extension bars 14, while the opposite ends of the other strap 19 is likewise bolted to the outer bar 12 of each leg 8, 9.

There is a pair of control levers 23, 24, rockably mounted intermediate their ends, on the pins 16 of each leg, the levers of each pair being mounted to each side of the inner bars 11 of each leg. These levers rock on the same horizontal axis and have portions thereof outside of and portions thereof inside of the frame 6.

A pair of companion levers 23 are longer than and project inwardly further than the pair of companion levers 24, so that eyelets 25 formed on the inner confronting ends of the levers, 23, clear the confronting ends of the pair of levers 24.

The confronting ends of the pair of levers 24, are forked to form V-shaped notches 26. The pairs of levers 23, are substantially angular in configuration and are rockably mounted on the pins 16 through their vertices.

The outer ends of the pairs of levers 23 are pivoted as at 27 to the upper ends of a pair of rigid, strap links 28, the lower ends of each links being pivoted as at 29 to the outer ends of the pair of upper tripping dogs, 30. These tripping dogs 30, are rockably mounted on pivots 31 intermediate their ends across the legs 8, 9. The pivots 31 are secured to the outer surface of the bars 11 of each leg. The inner ends 32 of the tripping dogs 30 are pointed as at 32 and swing inwardly to a horizontal position to grip the hay and swing outwardly to a vertical position substantially parallel to the legs to release the hay.

The outer ends of the pair of companion levers 24 are pivoted as at 33 to the upper ends of a pair of straight, rigid strap links 34, the lower ends of which are pivoted as at 35 to the outer ends of the lower pair of tripping dogs 36 located superjacent the point 13 on the end of the legs.

The tripping dogs 36 extend between the spaced bars 11, 12 that make up the legs 8, 9 of the frame, and are pivoted intermediate their ends as at 37 on the pins that bridge the space between the legs. The inner ends of the tripping dogs are pointed as at 38 and rock laterally to horizontal positions and seat in the space between the straps 11, 12 when in the vertical, released position.

The flexible control cable 39 extends between the legs of the frame 6 and near its upper end extends out into two branches 40, 41 that in turn are trained through the central pocket formed by the opposed offset portions 20, 21 of the cross members 17.

The ends of the branches are coupled to the eyelets 25 on the inner ends of the pair of companion control levers 23 that control the upper pair of the tripping dogs, 30. Intermediate the ends of each branch 40, 41, there are formed the knots 42, 43.

Now in the application of the hay fork in the present invention, it is forced downwardly into the hay with all parts as shown in Fig. 1. Then the pairs of control levers 23, 24 are moved upwardly by the hand of the operator from the position shown in Fig. 1 to that position shown in Fig. 4 of the drawings.

This latter operation, causes the upper and lower pairs of tripping dogs to bite into the hay disposed between the legs of the frame. In this latter position, the knots 42, 43 are forced tightly into the V-shaped notches on the end of the pair of levers 24, that control the gripping of the lower pair of tripping dogs 36.

Positioned, as shown in Fig. 4 of the drawings, the frame 6 is hoisted and taken into the hay mow. When the fork has reached a position over the depression in the hay mow, the control cable 39 is pulled downwardly until the knots 42, 43, are out of the grooves 26, which in turn, releases one pair of the load held by the fork.

The frame 6 may be then moved to the other position requiring filling and the control cable 39 pulled further, the latter action releasing the balance of the load that is held by the upper pair of tripping dogs 30.

The present embodiment of the invention has been disclosed in considerable detail merely for the purpose of exemplification, since in actual practice it attains the features of advantage enumerated as desirable in the statement of the invention and the above description.

It is to be understood that by describing in detail herein any particular form, structure, or arrangement, it is not intended to limit the invention beyond the terms of the claim or the requirements of the prior art.

Having thus described our invention, what we claim as new is: —

A hay fork comprising a U-shaped frame having the depending legs thereof forming spaced piercing shafts, pairs of opposed tripping dogs rockably connected to the legs one above the other, control levers rockably connected to each leg above the uppermost dog and one for each tripping dog, links connecting the one end of each control lever to each tripping dog, a cable having branches leading to the other end of one pair of control levers, co-acting means on the other ends of the other pair of control levers and on the branches for independently rocking said other pair of control levers, the means on the pair of control levers consisting of V-shaped notches and said means on the branches consisting of knots.

In testimony whereof we affix our signatures.

CHARLES B. BROUGHTON.
DALE A. LEIFHEIT.
CARL A. CARLSON.